(12) United States Patent
Chu et al.

(10) Patent No.: US 7,634,032 B2
(45) Date of Patent: Dec. 15, 2009

(54) SYSTEM AND METHOD FOR DETECTING NON-LINEAR DISTORTION OF SIGNALS COMMUNICATED ACROSS TELECOMMUNICATION LINES

(75) Inventors: Fred Chu, Madison, AL (US); Michael D. Turner, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 830 days.

(21) Appl. No.: 10/793,295

(22) Filed: Mar. 4, 2004

(65) Prior Publication Data
US 2005/0207346 A1 Sep. 22, 2005

(51) Int. Cl.
H04L 1/00 (2006.01)
(52) U.S. Cl. ........................................ 375/346; 455/296
(58) Field of Classification Search ................. 375/341, 375/346, 285; 455/295, 296, 63.1, 114.2; 324/620, 625, 626
See application file for complete search history.

(56) References Cited

U.S. PATENT DOCUMENTS

| | | | |
|---|---|---|---|
| 3,647,992 A | 3/1972 | Thomas | |
| 4,669,116 A | 5/1987 | Agazzi et al. | |
| 4,977,591 A | 12/1990 | Chen et al. | |
| 5,148,427 A | 9/1992 | Buttle et al. | |
| 5,329,586 A | 7/1994 | Agazzi | |
| 5,500,892 A | 3/1996 | Essig | |
| 5,627,885 A | 5/1997 | Paneth et al. | |
| 5,778,055 A | 7/1998 | Paneth et al. | |
| 6,185,261 B1 * | 2/2001 | Creigh et al. | 375/285 |
| 6,192,227 B1 * | 2/2001 | Tenny | 455/295 |
| 6,516,063 B1 | 2/2003 | Farrell et al. | |
| 6,655,592 B2 * | 12/2003 | Shaked et al. | 235/462.01 |
| 6,687,235 B1 | 2/2004 | Chu | |
| 7,009,945 B1 * | 3/2006 | Tang et al. | 370/286 |
| 2003/0104792 A1 * | 6/2003 | Doi | 455/115 |

OTHER PUBLICATIONS

June-Yule Lee and A.K.Nandi, "Maximum likelihood parameter estimation of the asymmetric generalised Gaussian family of distributions", Higher-Order Statistics, Proceedings of the IEEE Signal Processing Workshop, University of Liverpool, UK, 1999.*

A.Tesei, and C.S.Regazzoni, "The Asymmetric Generalized Gaussian Function: a New HOS-Based Model for Generic Noise Pdfs", University of Genoa, Italy, 1996 IEEE.*

Xin Jiang and Ioannis Roudas,"Asymmetric Probability Density Function of a Signal with Interferometric Crosstalk", 2001 IEEE.*

* cited by examiner

Primary Examiner—Chieh M Fan
Assistant Examiner—Aristocratis Fotakis
(74) Attorney, Agent, or Firm—Lanier Ford Shaver & Payne, P.C.; Jon E. Holland

(57) ABSTRACT

A system for detecting non-linear distortion comprises an error detector and logic. The error detector is configured to estimate signal errors associated with signals communicated across a telecommunication line. The logic is configured to track the signal errors and to detect whether the signals are subject to non-linear distortion based on a history of the signal errors.

30 Claims, 8 Drawing Sheets

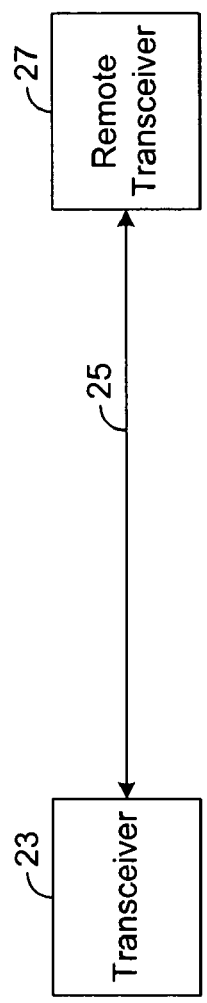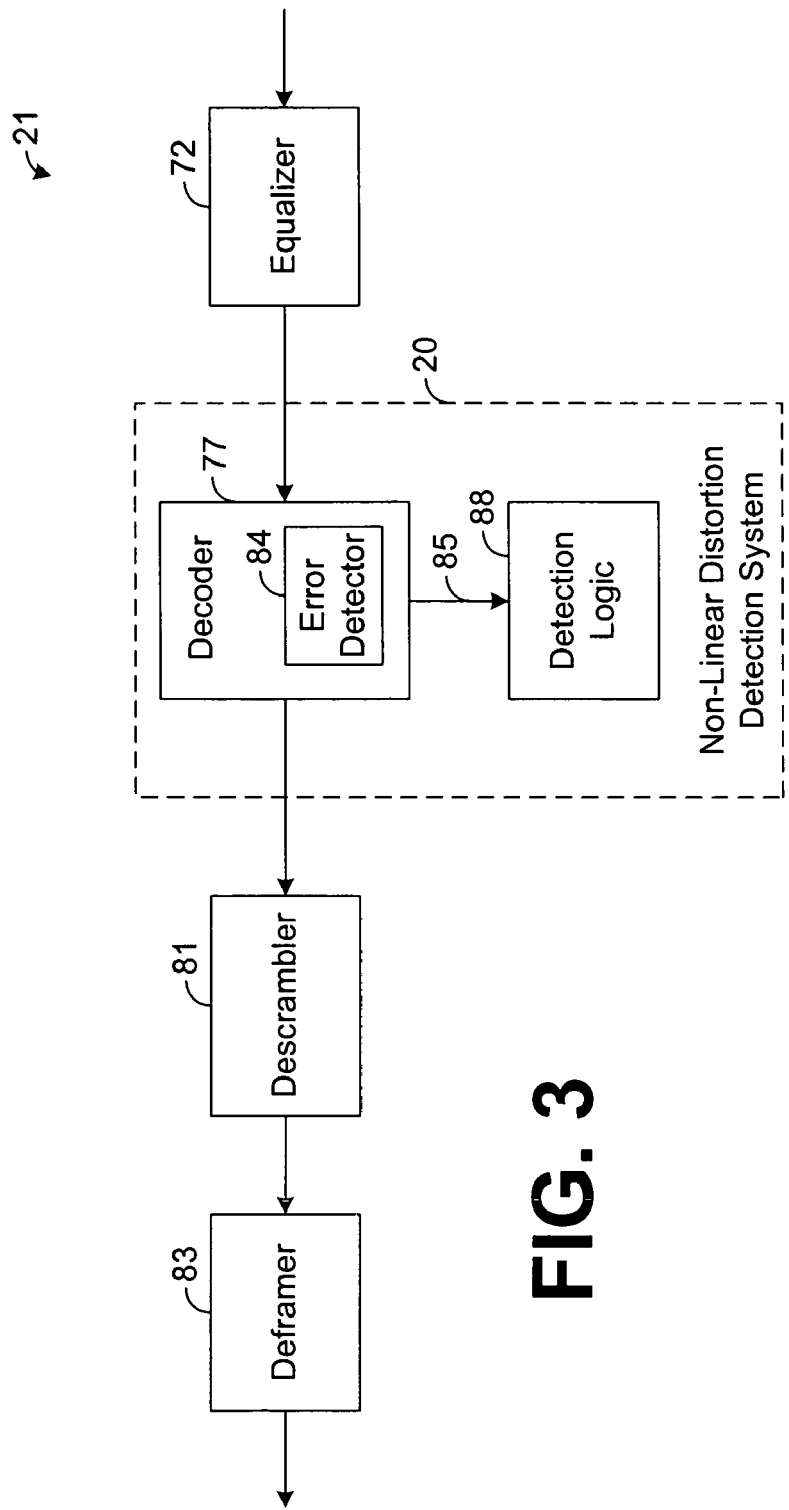

SYSTEM AND METHOD FOR DETECTING NON-LINEAR DISTORTION OF SIGNALS COMMUNICATED ACROSS TELECOMMUNICATION LINES

RELATED ART

Distortion of signals communicated across a telecommunication line, such as digital subscriber line (xDSL) signals, for example, can be caused by numerous problems, and it can be difficult to diagnose the source of such problems. Various diagnostic techniques have been employed to identify or isolate the sources of communication problems that cause distortion to the signals communicated across telecommunication lines.

As an example, in an effort to isolate communication problems on a telecommunication line, detectors have been used to detect non-linear distortion. "Non-linear distortion" generally refers to distortion caused by a condition that distorts a signal such that the amplitude of the distorted signal does not have a linear relationship to the amplitude of the signal prior to the distortion. In general, non-linear distortion on telecommunication lines is caused by a limited number of problems, such as degraded splices or faulty lightning protectors, and determining whether signals transmitted along a telecommunication line are subject to a significant amount of non-linear distortion can help to diagnose the source of a significant communication problem.

Unfortunately, detecting non-linear distortion can be difficult or burdensome. For example, non-linear distortion can be detected using non-linear echo canceller and non-linear equalization techniques, such as truncated Volterra polynomial expansion and piece-wise linear approximation. However, such techniques are complex and costly to implement. In another example, equipment referred to as transmission impairment measurement sets or "TIMS" can be used to detect non-linear distortion. However, such equipment is expensive, and technicians often expend a relatively large amount of time and effort in interfacing this test equipment with various telecommunication lines for non-linear distortion testing.

Moreover, simpler, less expensive, and less burdensome approaches to detecting non-linear distortion are generally desirable.

SUMMARY OF THE DISCLOSURE

Generally, embodiments of the present disclosure provide systems and methods for detecting non-linear distortion of signals communicated across telecommunication lines.

A system for detecting non-linear distortion in accordance with one exemplary embodiment of the present disclosure comprises an error detector and logic. The error detector is configured to detect signal errors based on signals communicated across a telecommunication line. Each of the signal errors is associated with a respective one of the signals. The logic is configured to determine a value indicative of a number of the errors that are within a specified range, and the logic is further configured to detect whether the signals are subject to non-linear distortion based on the value.

A system for detecting non-linear distortion in accordance with another exemplary embodiment of the present disclosure comprises an error detector and logic. The error detector is configured to detect signal errors associated with signals communicated across a telecommunication line. The logic is configured to detect non-linear distortion of the signals based on whether an error distribution associated with the signal errors is asymmetrical.

A system for detecting non-linear distortion in accordance with yet another exemplary embodiment of the present disclosure comprises an error detector and logic. The error detector is configured to estimate signal errors associated with signals communicated across a telecommunication line. The logic is configured to track the signal errors and to detect whether the signals are subject to non-linear distortion based on a history of the signal errors.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 2 is a block diagram illustrating the transceiver of FIG. 1 coupled to a remote transceiver via a telecommunication line.

FIG. 3 is a block diagram illustrating a receiver depicted in FIG. 1.

DETAILED DESCRIPTION

The present disclosure generally pertains to systems and methods for detecting non-linear distortion of signals communicated across a telecommunication line. A non-linear distortion detection system in accordance with an exemplary embodiment of the present disclosure is implemented within or is in communication with a receiver that is receiving data signals from a telecommunication line. The non-linear distortion detection system detects the error associated with each received data signal. By tracking the data signal error over time, the detection system is able to determine whether the data signals are subject to non-linear distortion.

Figure 1:
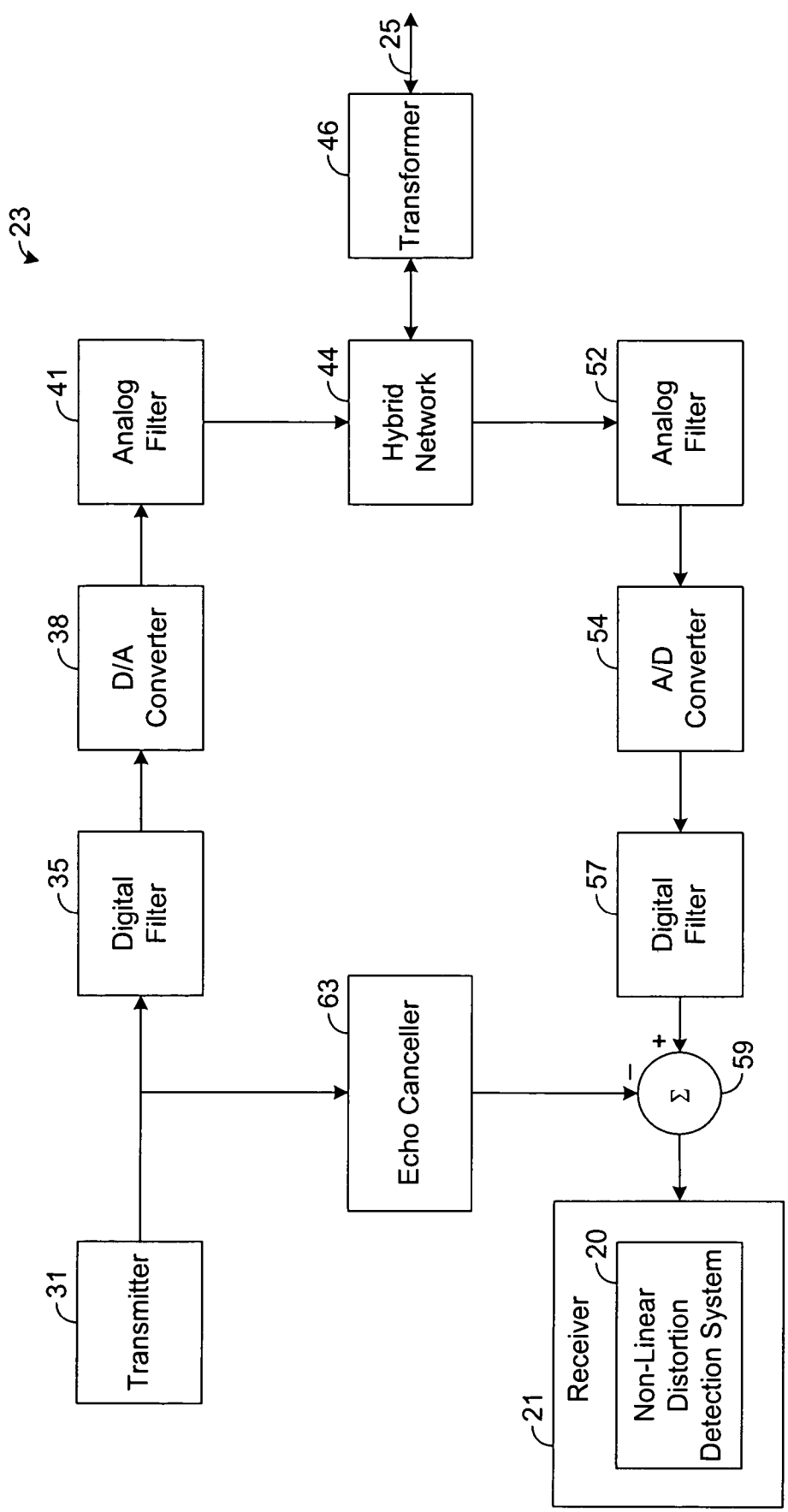
FIG. 1 is a block diagram illustrating a transceiver that employs a non-linear distortion detection system in accordance with an exemplary embodiment of the present disclosure.

FIG. 1 depicts a transceiver 23, such as a digital subscriber line (xDSL) transceiver, that employs a system 20 for detecting non-linear distortion in accordance with an exemplary embodiment of the present disclosure. As shown by FIG. 1, the detection system 20 may reside within a receiver 21, which is coupled to and communicates over a telecommunication line 25. However, it should be noted that one or more components of the detection system 20 may be located external to the transceiver 23 and/or receiver 21, if desired.

As shown by FIG. 2, the transceiver 23 is coupled to a remote transceiver 27 via the telecommunication line 25. In one example, the transceiver 23 resides at a central office of a communication network, and the remote transceiver 27 resides at a customer premises. In another example, the transceiver 23 resides at a customer premises, and the remote transceiver 27 resides at a central office. Other locations for the transceivers 23 and 27 are possible in other embodiments.

As shown by FIG. 1, the transceiver 23 comprises a transmitter 31 that transmits a digital data signal to a digital filter 35, which filters the digital data signal and provides a filtered digital signal to a digital-to-analog (D/A) converter 38. The D/A converter 38 converts the filtered digital signal into an analog signal, which is filtered by an analog filter 41. This filtered analog signal is then applied to the telecommunication line 25 via a hybrid network 44 and a line-coupling transformer 46.

An analog signal transmitted over the telecommunication line 25 from the remote transceiver 27 is coupled through transformer 46 and hybrid network 44 and is applied to an analog filter 52, which filters the received analog signal and provides a filtered analog signal to an analog-to-digital (A/D) converter 54. The A/D converter 54 converts the filtered analog signal into a digital signal, which is filtered by a digital filter 57. A differential summer 59 combines this filtered digital signal with an echo cancellation signal from an echo canceller 63 in order to cancel, from the filtered digital signal, echoes of signals transmitted by the transceiver 23 over the telecommunication line 25. The combined signal from the differential summer 59 is then received by the receiver 21.

Various known or future-developed echo cancellers may be used to implement the echo canceller 63 of FIG. 1. In one exemplary embodiment, the echo canceller 63 is implemented as a linear adaptive finite impulse response (FIR) filter that uses a least mean squared (LMS) algorithm or other known or future-developed adaptive FIR algorithm to provide an echo cancellation signal that minimizes the error of the combined signal output from the differential summer 59. In other embodiments, other types of echo cancellers may be employed. Further, the foregoing description of transceiver 23 is provided for illustrative purposes, and changes to the configuration and operation of the transceiver 23 may be made without departing from the principles of the present disclosure.

As shown by FIG. 3, the receiver 21 comprises an equalizer 72 that equalizes the combined signal received from the differential summer 59 (FIG. 1). A decoder 77 decodes the equalized signal to recover digital data originally transmitted by the remote transceiver 27 (FIG. 2). Known or future-developed decoders, such as Trellis decoders or Reed-Solomon decoders, for example, may be used to implement the decoder 77 of FIG. 3. Symbol-based decoders, such as Trellis decoders, for example, map each received data symbol into a digital data representation of the received symbol.

The decoded signal output from the decoder 77 is received by a descrambler 81 and a deframer 83 that respectively descramble and deframe the decoded signal. The signal output by the deframer 83 may then be processed by any data processing device (e.g., a computer, a telephone, a facsimile machine, etc.) in communication with the receiver 21.

For each decoded signal, an error detector 84 residing within the decoder 77 detects the amount of error associated with the signal and provides an error signal 85 that is indicative of the amount of error detected by the error detector 84 for the decoded signal. Note that many conventional decoders are implemented with such an error detector. Thus, for many conventional decoders, reconfiguration of the decoder will be unnecessary to implement the decoder 77 within the non-linear distortion detection system 20 described herein. However, it is unnecessary to implement the error detector 84 within a decoder 77 as is shown by FIG. 3. Indeed, any device capable of determining the errors associated with signals received by the transceiver 23 may be used to implement the error detector 84 described herein.

In general, the amount of error detected for a signal refers to the difference between the signal's value, as received by a receiver, and the signal's value, as originally transmitted by a transmitter. For example, if the transceiver 23 (FIG. 2) transmits a signal having a value of 1.0 and if the error detector 84 determines that the signal's value, when received and decoded by the decoder 77, is 1.2, then the error detector 84 outputs an error signal 85 having a value of 0.2 (i.e., the difference between the signal's transmitted and received values). Thus, the detection logic 88 receives the error signal 85 and, based on the error signal 85, is able to determine the amount of error associated with the received signal, as will be described in more detail hereafter.

The detection logic 88 can be implemented in software, hardware, or a combination thereof. In an exemplary embodiment illustrated in FIG. 4, the detection logic 88, along with its associated methodology, is implemented in software and stored in memory 92.

Note that the detection logic 88, when implemented in software, can be stored and transported on any computer-readable medium for use by or in connection with an instruction execution system, apparatus, or device, such as a computer-based system, processor-containing system, or other system that can fetch and execute instructions. In the context of this document, a "computer-readable medium" can be any means that can contain, store, communicate, propagate, or transport a program for use by or in connection with the instruction execution system, apparatus, or device. The computer readable-medium can be, for example but not limited to, an electronic, magnetic, optical, electromagnetic, infrared, or semiconductor system, apparatus, device, or propagation medium. Note that the computer-readable medium could even be paper or another suitable medium, upon which the program is printed, as the program can be electronically captured, via for instance optical scanning of the paper or other medium, then compiled, interpreted or otherwise processed in a suitable manner if necessary, and then stored in a computer memory.

Figure 4:
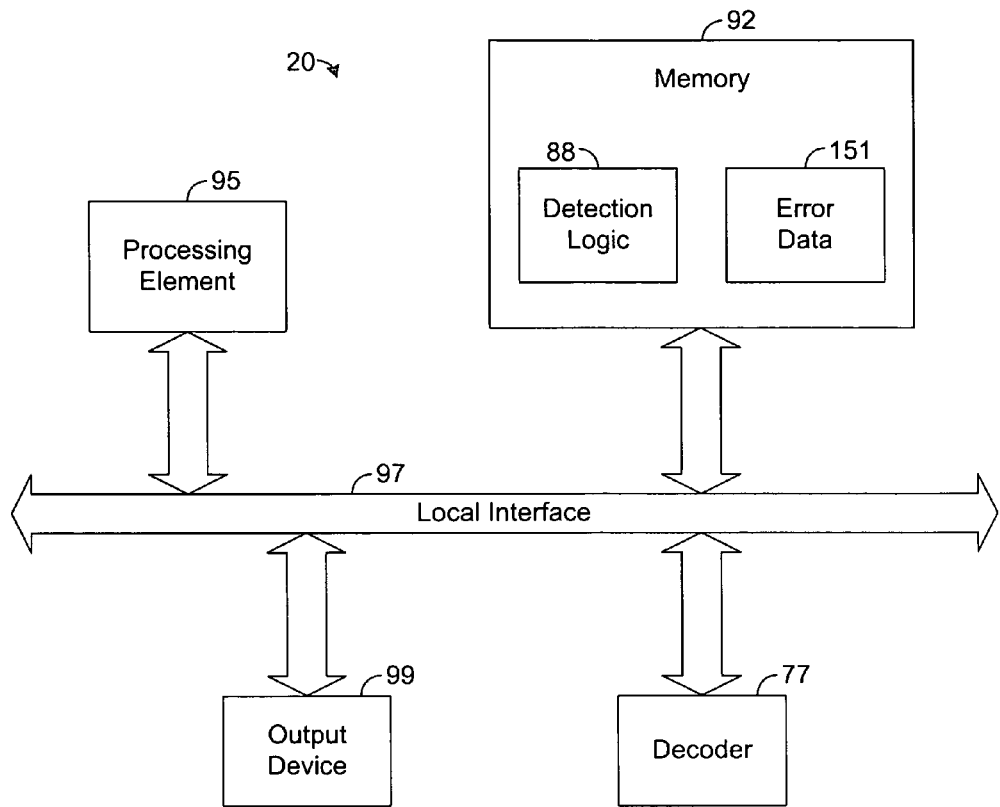
FIG. 4 is a block diagram illustrating a non-linear distortion detection system depicted in FIGS. 1 and 3.

The exemplary embodiment of the non-linear distortion detection system 20 depicted by FIG. 4 comprises at least one conventional processing element 95, such as a digital signal processor (DSP) or a central processing unit (CPU), that communicates to and drives the other elements within the system 20 via a local interface 97, which can include at least one bus. Furthermore, an output device 99, for example, a display device or a printer, can be used to output data to a user of the system 20.

The detection logic 88, based on the error signal 85, tracks the error (referred to hereafter as "signal error") detected by the error detector 84 and, based on a history of the signal error, determines whether the decoded signals are subject to a significant amount of non-linear distortion. In this regard, for pulse amplitude modulation (PAM), the error distribution of the signal errors detected by an error detector within a decoder normally appears as a Gaussian bell-shaped curve with two tails, referred to herein as a "negative tail" and a "positive tail," respectively located at the ends of the Gaussian bell-shaped curve, as will be described in more detail hereinbelow.

Figure 5:
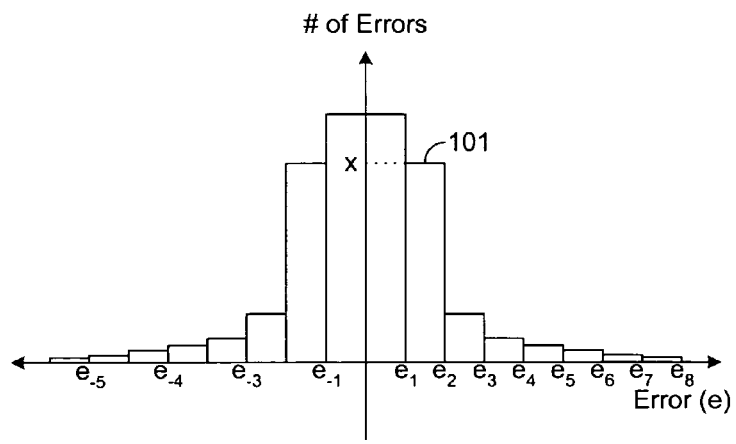
FIG. 5 is a graph illustrating an exemplary error histogram for pulse amplitude modulated signals received by the transceiver of FIG. 1 when such signals are not subject to a significant amount of non-linear distortion.

FIG. 5 shows an exemplary histogram of the signal errors detected by the error detector 84 when there is very little non-linear distortion occurring on telecommunication line 25. Each bar depicted in FIG. 5 represents the number of errors detected for a particular range of error values during a particular sampling period. For example, bar 101 represents the number (x) of errors detected having a value between error values $e_1$ and $e_2$.

Figure 6:
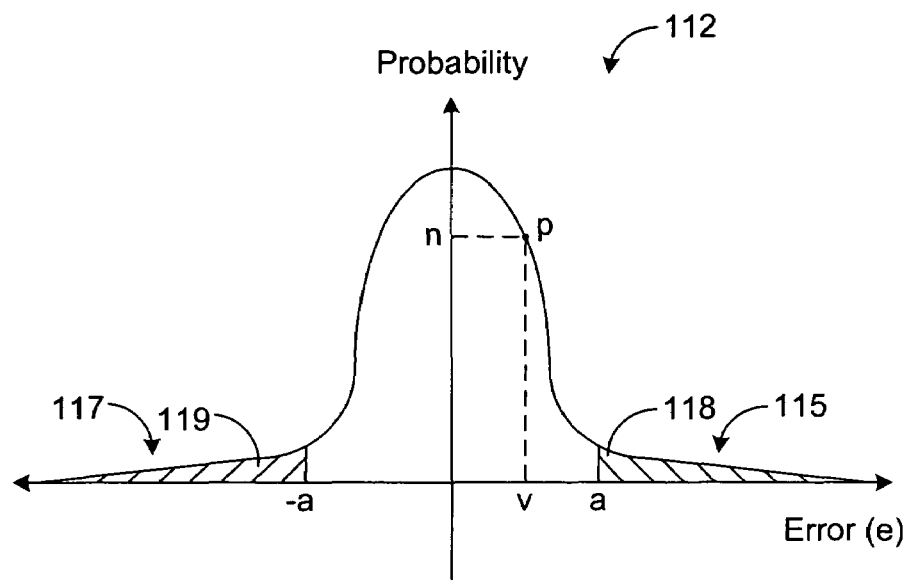
FIG. 6 is a graph illustrating a probability density function fitted to the histogram of FIG. 5.

FIG. 6 depicts a probability density function fitted to the histogram shown in FIG. 5. As shown by FIG. 6, the probability density function of the histogram of FIG. 5 appears as a Gaussian bell-shaped curve 112. The curve 112 represents the error distribution detected by the error detector 84, and each point along the curve 112 represents the relative probability for a particular error value.

The Gaussian bell-shaped curve 112 of FIG. 6 has a positive tail 115 comprising the portion of the curve 112 above $\alpha$, and the Gaussian bell-shaped curve 112 has a negative tail 117 comprising the portion of the curve 112 below $-\alpha$. For the purposes of illustration, assume that $\alpha$ equals approximately $3\sigma$, where $\sigma$ is the standard deviation of the curve 112. However, in other embodiments, it is possible for $\alpha$ to have other values without departing from the principles of the present disclosure.

When very little non-linear distortion occurs to the signals communicated across telecommunication line 25 (FIG. 2), the curve 112 has a tail distribution that is substantially symmetrical, as shown by FIG. 6. In other words, the positive tail 115 and the negative tail 117 are substantially symmetrical. In this regard, the area 118 under the positive tail 115 is substantially equal to the area 119 under the negative tail 117.

Figure 7:
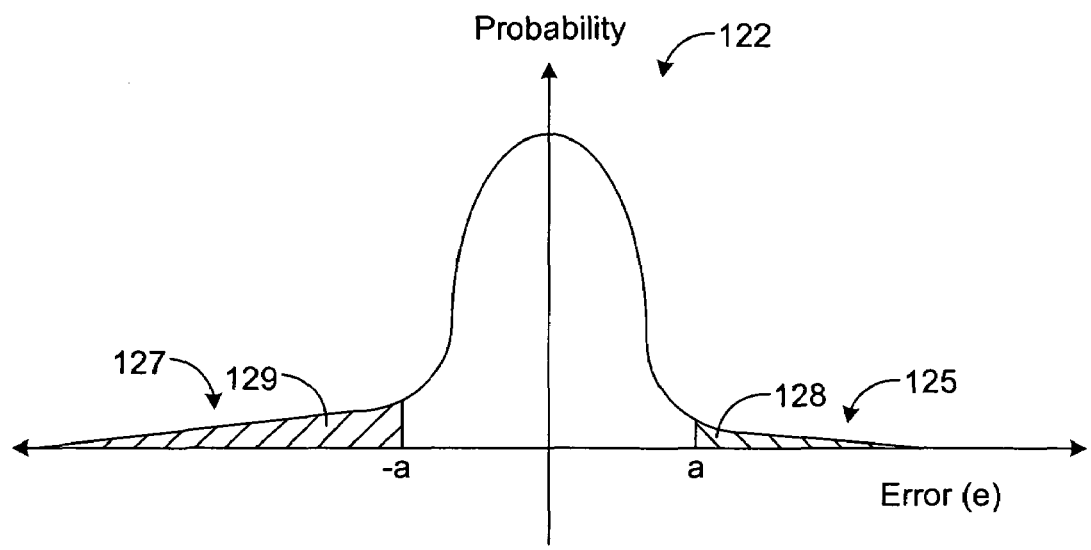
FIG. 7 is a graph illustrating an exemplary probability density function indicating the error value probability for pulse amplitude modulated signals received by the transceiver of FIG. 1 when such signals are subject to a significant amount of non-linear distortion.

However, when significant non-linear distortion occurs to the signals communicated across telecommunication line 25, the tail distribution is substantially asymmetrical. For example, FIG. 7 depicts an exemplary probability density function of the signal error detected by error detector 84, as represented by curve 122, when significant non-linear distortion occurs to the signals communicated across the telecommunication line 25 (FIG. 2). As shown by FIG. 7, the curve 122 has a positive tail 125 and a negative tail 127 that are substantially asymmetrical. In this regard, the area 128 under the positive tail 125 is substantially different than the area 129 under the negative tail 127.

An asymmetric tail distribution is generally caused by the detection of substantially more positive errors than negative errors or vice versa. As used herein, a "positive error" is a signal error that results in a positive value for the error signal 85, and a "negative error" is a signal error that results in a negative value for the error signal 85. For example, if the value of the error signal 85 is obtained by the error detector 84 (FIG. 3) subtracting the value of a received signal from the signal's correct value, then a positive error is detected when the correct value exceeds the received value. Also, a negative error is detected when the received value exceeds the correct value.

Note that FIG. 7 represents a situation where the number of negative errors with a value below $-\alpha$ is substantially greater than the number of positive errors with a value greater than $\alpha$. Thus, in FIG. 7, the area 128 under the positive tail 125 is substantially less than the area 129 under the negative tail 127. If the number of positive errors with a value greater than $\alpha$ substantially exceed the number of negative errors with a value below $-\alpha$, then the area 128 under the positive tail 125 would be substantially greater than the area 129 under the negative tail 127.

Referring to FIG. 3, based on the error signal 85, the detection logic 88 counts, over time, the number of positive errors detected by the error detector 84 that exceed a positive threshold, $\alpha$, and counts, over the same time period, the number of negative errors detected by the error detector 84 that are below a negative threshold, $-\alpha$. Note that the positive and negative thresholds are set such that the area of the negative tail substantially equals the area of the positive tail if the decoded signals are not subject to significant non-linear distortion. When the error distribution is substantially centered about 0, as shown in FIGS. 6 and 7, the magnitude of the positive and negative thresholds is substantially equal. In other words, the absolute value of the positive threshold is substantially equal to the absolute value of the negative threshold. However, it is possible for the magnitudes of the positive and negative thresholds to be different particularly if the error distribution is not substantially centered about 0.

If the difference in the total number of positive errors exceeding the positive threshold and the total number of negative errors below the negative threshold is significant (e.g., the difference exceeds a specified threshold), then the detection logic 88 detects the presence of non-linear distortion. In such a situation, the detection logic 88 provides a non-linear distortion indication via output device 99 (FIG. 4). If the aforementioned difference is insignificant (e.g., the difference is below the specified threshold), then the detection logic 88 does not provide a non-linear distortion indication unless non-linear distortion is later detected after taking new error samples.

Note that the non-linear distortion indication provided by the detection logic 88 may comprise a visual or a verbal message explaining that non-linear distortion has been detected. In another embodiment, the non-linear distortion indication may be communicated by activating a light source (e.g., a light emitting diode) or a sound source such that a visual or non-visual alarm is generated when non-linear distortion is detected by the detection logic 88. In another embodiment, the detection logic 88 may transmit a message to a remote network management system that is monitoring many other transceivers in addition to the transceiver 23 shown by FIG. 1. Various other techniques for communicating a non-linear distortion indication to a user are possible.

Further note that the thresholds described above (i.e., the positive threshold, the negative threshold, and the specified threshold) may be determined empirically. For example, different values of these thresholds may be used during different time periods when it is known whether or not signals communicated across a telecommunication line 25 or a simulated telecommunication line are subject to non-linear distortion. Thresholds providing accurate results (i.e., accurately indicating when signals communicated across the telecommunication line under test are subject to non-linear distortion) may then be used to enable the detection logic 88 to detect non-linear distortion on the telecommunication line 25 according to the techniques described herein.

Figure 8:
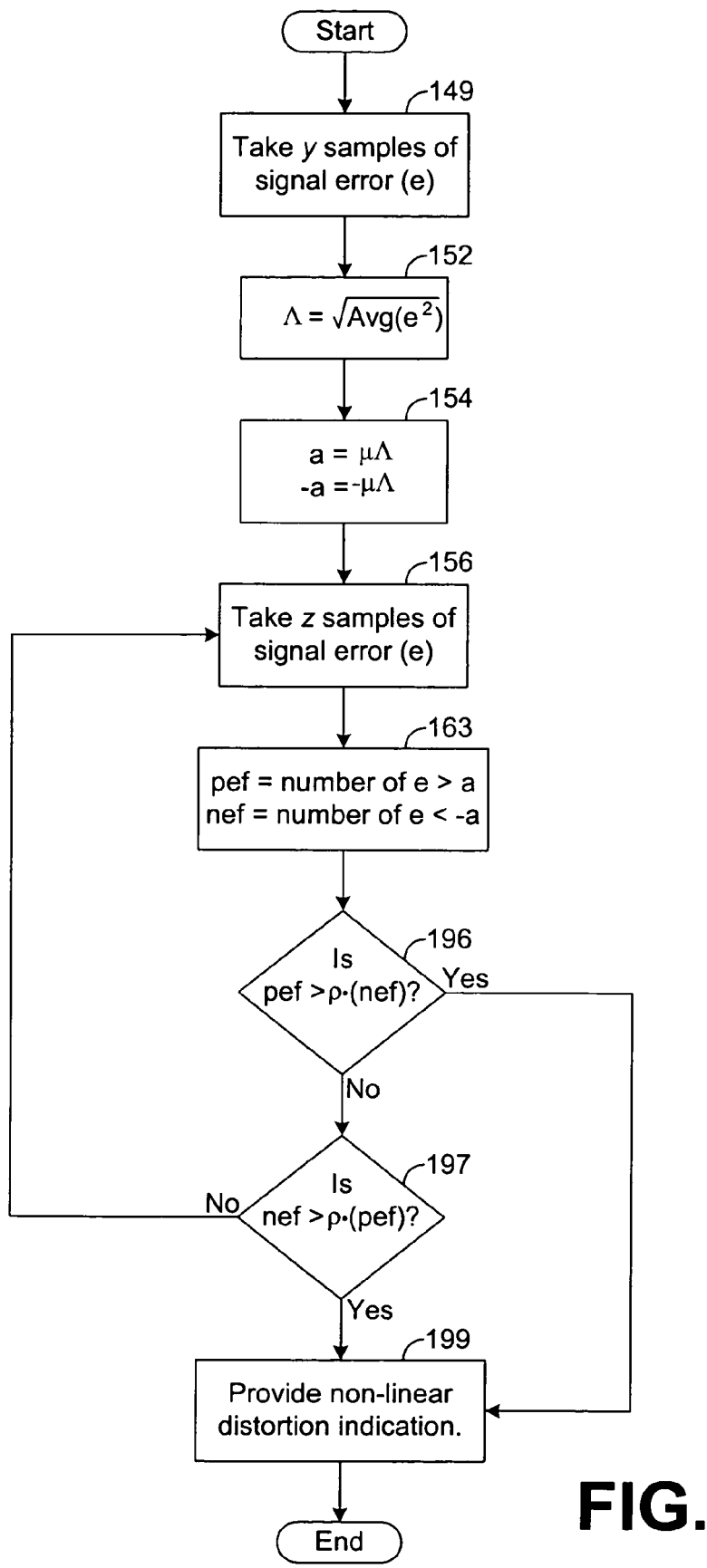
FIG. 8 is a flow chart illustrating an exemplary methodology that may be used to detect non-linear distortion for pulse amplitude modulated signals.

FIG. 8 depicts an exemplary methodology for detecting when PAM signals transmitted across the telecommunication line 25 are subject to non-linear distortion by analyzing statistics of the error distribution for signal errors detected by the error detector 84. For illustrative purposes, assume that the decoder 77 is symbol-based in that the decoder 77 maps received data symbols into digital data. However, it should be noted that in other embodiments, the same techniques described hereafter may be used to analyze decoders that are not symbol-based.

Initially, the signal error (e) for y number of decoded symbols is calculated by the error detector 84 in block 149 of FIG. 8. As set forth above, the signal error for a decoded symbol is the difference between the symbol's decoded value and the symbol's correct value. Note that the decoder 77 may determine a symbol's correct value using well-known or future developed decoding techniques for performing cyclic redundancy checking (CRC) and mapping the data bits into the symbol value. For each decoded symbol, the error detector 84 calculates the symbol's error and transmits this calculated error value to detection logic 88 via error signal 85. The detection logic 88 stores the signal error (e) received from error detector 84 as error data 151 (FIG. 4).

After y number of signal error values have been calculated, the detection logic 88 calculates $\Lambda$, which is preferably the square root of the average of the square of the signal error, as shown by block 152. Thus, to calculate $\Lambda$, the detection logic 88 squares each of the aforementioned y signal error values and sums these squared values. The detection logic 88 then divides the result by y and takes the square root of the resulting value. In one exemplary embodiment, y is equal to 10,000. However, y may be equal to other values in other embodiments.

Note that $\Lambda$ is a measure of the average signal quality associated with the signals decoded by the decoder 77 during the time period that the y samples are taken. Other techniques for determining the signal quality associated with the sampled signals may be used to determine $\Lambda$ in other embodiments.

After establishing $\Lambda$, the positive threshold, $\alpha$, and the negative threshold, $-\alpha$, are calculated by the detection logic 88. In this regard, $\alpha$ equals $\mu\Lambda$ and $-\alpha$ equals $-\mu\Lambda$, where the value of $\mu$ is empirically determined. Experiments have shown that a value of $\mu$ between 2.0 and 3.0 provides reliable results, although other values of $\mu$ are possible.

As shown by block 156, z number of signal error samples are taken, as shown by block 156. In this regard, the signal error (e) for each of the z number of decoded symbols is calculated by the error detector 84. For each decoded symbol, the error detector 84 calculates the symbol's error and transmits this calculated error value to detection logic 88 via error signal 85. The detection logic 88 stores the signal error (e) received from error detector 84 as error data 151 (FIG. 4). In one exemplary embodiment, z is equal to 10,000, but z may be equal to other values in other embodiments.

For these z signal errors, the detection logic 88 calculates the positive error function (pef) and the negative error function (nef) in block 163. The positive error function is equal to the number of z signal error values that exceed the positive threshold, $\alpha$, and the negative error function is equal to the number of z signal error values that are below the negative threshold, $-\alpha$.

Figure 9:
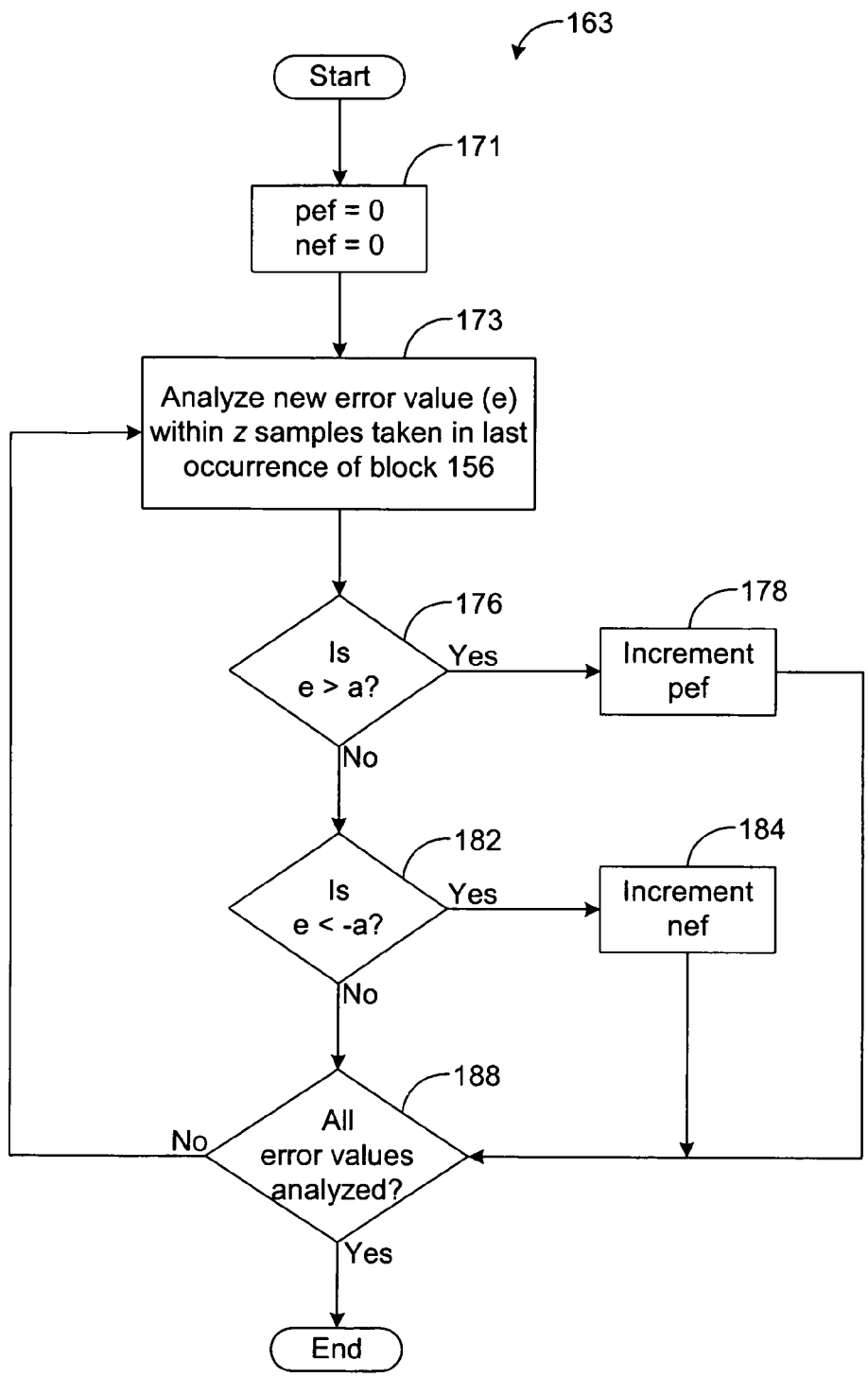
FIG. 9 is a flow chart illustrating an exemplary methodology for calculating positive and negative error functions for use in the methodology depicted by FIG. 7.

FIG. 9 depicts an exemplary methodology that may be used to calculate the positive and negative error functions. In this regard, as shown by block 171, the detection logic 88 initializes both of the positive and negative error functions to a value of 0. Then, in block 173, the detection logic 88 selects and analyzes a new error value within the z samples taken in the last occurrence of block 156 (FIG. 8). If this error value is greater than the positive threshold, $\alpha$, then the detection logic 88 increments the positive error function, as shown by blocks 176 and 178. Further, if the error value is less than the negative threshold, $-\alpha$, then the detection logic 88 increments the negative error function, as shown by blocks 182 and 184. As shown by block 188, the detection logic 88 determines whether all of the error values within z samples taken in the last occurrence of block 156 have been analyzed. If not, the detection logic 88 returns to block 173. Otherwise, the process depicted by FIG. 9 ends.

After calculating the positive and negative error functions, the detection logic 88 determines whether the positive error function (pef) is greater than $\rho \cdot$(nef) or whether the negative error function (nef) is greater than $\rho \cdot$(pef), as shown by blocks 196 and 197. Note that $\rho$ is a statistical parameter based on the number of samples taken (i.e., the value of z) and the desired confidence level of the detection process. Preferably, $\rho$ has a value greater than 1.0 and the higher the value of $\rho$, the lower the confidence level that a given amount of nonlinearity will be detected for a given number of samples (i.e., for a given z). However, as z increases, it is possible to increase the value of $\rho$ without significantly affecting the confidence level of the detection process since more samples inherently provide a more reliable result. Moreover, for z equal to 10,000, a value of 1.75 for $\rho$ has been found to provide reliable results. However, other values of $\rho$ are possible.

If "no" determinations are made in blocks 196 and 197, then the positive and negative tails of the error distribution for the z samples taken by the error detector 84 are substantially symmetrical. Thus, a non-linear distortion indication is not provided, and the process of taking new z samples of signal error and statistically analyzing the error distribution of the new z samples, as shown by blocks 156, 163, 196, and 197 is repeated. However, if a "yes" determination is made in either block 196 or 197, then the positive and negative tails of the error distribution for the z samples taken by the error detector 84 are substantially asymmetrical. In such a case, the detection logic 88 provides a non-linear distortion indication in block 199. Providing such an indication informs a user that the detection logic 88 has detected non-linear distortion in the signals associated with the z samples taken in the last occurrence of block 156. The confidence level may be increased by requiring several of these non-linear distortion indications in a row before declaring that the signal is indeed affected by non-linear distortion.

It should be noted that various methodologies may be used to implement the functionality of FIG. 7 and blocks 196 and 197 in particular. For example, blocks 196 and 197 may be implemented by calculating a ratio of pef to nef and then determining whether the ratio is within a specified range. Other techniques for performing blocks 196 and 197, as well as other blocks of FIG. 7, are possible without departing from the principles of the present disclosure.

Figure 10:
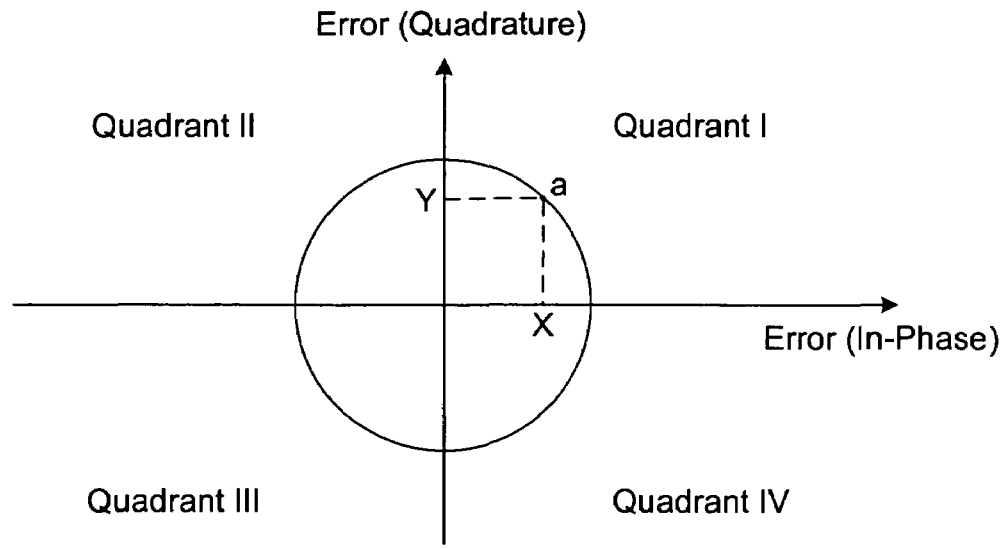
FIG. 10 is a graph illustrating an exemplary error distribution for quadrature amplitude modulated signals received by the transceiver of FIG. 1 when such signals are not subject to a significant amount of non-linear distortion.

It should be further noted that if the transceiver 23 is configured to communicate quadrature amplitude modulated signals, then the distribution of the error detected by decoder 77 appears differently than the Gaussian bell-shaped curves depicted by FIGS. 6 and 7. In this regard, FIG. 10 depicts an exemplary error distribution for the transceiver 23 when the transceiver 23 is employing quadrature amplitude modulation (QAM) and there is very little non-linear distortion occurring to the signals communicated across telecommunication line 25. As can be seen by examining FIG. 10, the error distribution of such signals forms a generally circular distribution, which is substantially symmetrical about both the quadrature error and in-phase error axes. In this regard, the average error magnitude in each quadrant is substantially equal.

Figure 11:
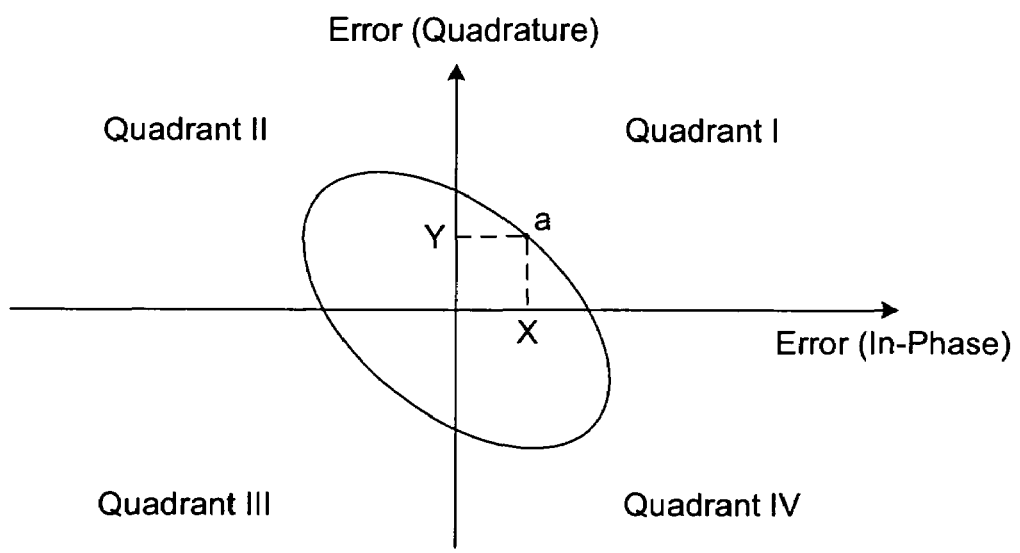
FIG. 11 is a graph illustrating an exemplary error distribution for quadrature amplitude modulated signals received by the transceiver of FIG. 1 when such signals are subject to a significant amount of non-linear distortion.

FIG. 11 depicts an exemplary error distribution for the transceiver 23 when the transceiver 23 is employing QAM and there is significant non-linear distortion occurring to the signals communicated across telecommunication line 25. The non-linear distortion skews the error distribution such that it is asymmetrical with respect to the quadrature error and in-phase error axes. The asymmetry of the error distribution shown by FIG. 11 results from the fact that the average error magnitude in some of the quadrants is significantly greater than in the other quadrants. In particular, in the example shown in FIG. 11, the average error magnitude in Quadrants I and III is significantly less than the average error magnitude in Quadrants II and IV, respectively.

Figure 12:
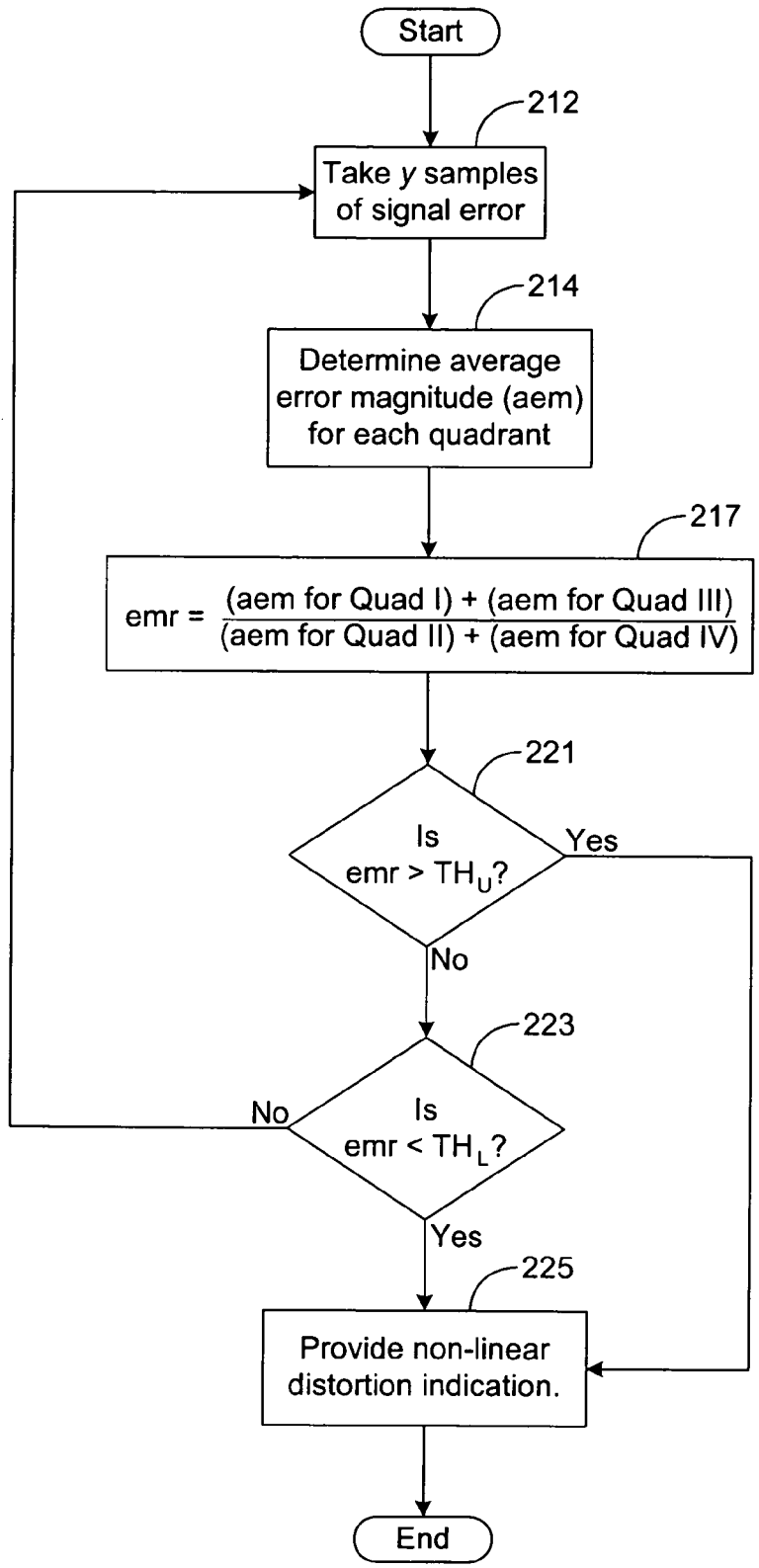
FIG. 12 is a flow chart illustrating an exemplary methodology that may be used to detect non-linear distortion for quadrature amplitude modulated signals.

Moreover, to detect when the error distribution of transceiver 23 is asymmetric while employing QAM and, therefore, to detect non-linear distortion, the detection logic 88 may be configured to determine the average error magnitude for each of the quadrants, as shown by blocks 212 and 214 of FIG. 12. Note that to determine the average error magnitude for a particular quadrant, the detection logic 88 can sum the magnitude of the error signals 85 associated with the particular quadrant and divide this sum by the total number of error signals 85 being summed together for the particular quadrant.

After determining the average error magnitude for each quadrant, the detection logic 88 may then determine an error magnitude ratio (emr) by summing the error magnitude of Quadrants I and III and dividing this sum by the sum of the error magnitude of Quadrants II and IV, as shown by block 217. The error magnitude ratio may then be compared to an upper threshold ($TH_U$) and a lower threshold ($TH_L$), as shown by blocks 221 and 223. The upper threshold is preferably set such that the error magnitude ratio exceeds the upper threshold only if the sum of the average error magnitude for Quadrants I and III are significantly higher than the sum of the average error magnitude for Quadrants II and IV thereby indicating that non-linear distortion is present on the telecommunication line 25. Further, the lower threshold is preferably set such that the error magnitude ratio falls below the lower threshold only if the sum of the average error magnitude for Quadrants II and IV are significantly higher than the sum of the average error magnitude for Quadrants I and III thereby indicating that non-linear distortion is present on the telecommunication line 25. Moreover, if the error magnitude ratio is greater than the upper threshold or less than the lower threshold, then the detection logic 88 provides a non-linear distortion indication in block 225.

Now, therefore, the following is claimed:

1. A receiver for detecting non-linear amplitude distortion, comprising:
   an error detector configured to detect signal amplitude errors for signals communicated across a telecommunication line from a remote transmitter to the receiver, each of the signal amplitude errors representing a difference in amplitude between a respective one of the signals as transmitted from the remote transmitter and the one signal as received by the receiver; and
   logic configured to determine a first value indicative of a total number of the signal amplitude errors that are within a first specified range and to determine a second value indicative of a total number of the signal amplitude errors that are within a second specified range, the logic configured to perform a comparison of the first and second values and to detect whether the signals are subject to non-linear amplitude distortion from the telecommunication line based on the comparison, wherein the first range is within a first tail of an amplitude error distribution of the signal amplitude errors, wherein the second range is within a second tail of the amplitude error distribution, wherein the comparison indicates whether the amplitude error distribution is symmetrical, and wherein the logic is configured to indicate that the signals are subject to the non-linear amplitude distortion if the comparison indicates that the amplitude error distribution is asymmetrical.

2. The receiver of claim 1, further comprising a decoder, wherein the error detector is implemented within the decoder, the decoder configured to decode the signals.

3. The receiver of claim 1, wherein the first value indicates a total number of the signal amplitude errors that exceed a threshold.

4. The receiver of claim 1, wherein the first value indicates a total number of the signal amplitude errors that are below a threshold.

5. The receiver of claim 1, wherein the logic is configured to determine whether the first and second values are substantially different, and wherein the logic is configured to detect that the signals are subject to non-linear amplitude distortion if the first and second values are determined to be substantially different by the logic.

6. The receiver of claim 1, wherein a first plurality of the signal amplitude errors are within the first specified range, wherein the logic is configured to determine the first value by counting the first plurality of signal amplitude errors, wherein a second plurality of the signal amplitude errors are within the second specified range, and wherein the logic is configured to determine the second value by counting the second plurality of signal amplitude errors.

7. receiver of claim 1 wherein the amplitude error distribution represents a plot of amplitude error versus error number.

8. receiver of claim 1, wherein the logic is configured to calculate a third value based on the signal amplitude errors, wherein the logic is configured determine an upper error threshold for the first specified range and a lower error threshold for the second specified range based on the third value, and wherein the lower error threshold is higher than the upper error threshold.

9. receiver of claim 8, wherein the third value is calculated by averaging the signal amplitude errors.

10. receiver of claim 8, wherein the logic is configured to determine the first value by counting a number of the signal amplitude that are below the upper error threshold, and wherein the logic is configured to determine the second value by counting a number of the signal amplitude errors that are above the lower error threshold.

11. The receiver of claim 10, wherein an absolute value of the upper error threshold is substantially equal to an absolute value of the lower error threshold.

12. A system for detecting non-linear amplitude distortion, comprising:
   an error detector configured to detect signal amplitude errors associated with signals communicated across a telecommunication line; and
   logic configured to determine an upper error threshold for a first tail of an amplitude error distribution associated with the signal amplitude errors and to determine a lower error threshold for a second tail of the amplitude error distribution, the logic configured to determine a first value indicative of a number of the signal amplitude errors below the upper error threshold and a second value indicative of a number of the signal amplitude errors above the lower error threshold, the logic further configured to perform a comparison of the first and second values, wherein the thresholds are determined such that the comparison indicates whether the amplitude error distribution is symmetrical, the logic further configured to indicate, based on the comparison, that the signals are subject to non-linear amplitude distortion if the comparison indicates that the amplitude error distribution is asymmetrical.

13. The system of claim 12, wherein the logic is configured to determine a third value indicative of an average magnitude for a plurality of the signal amplitude errors, and wherein the logic is configured to calculate the upper error threshold based on the third value.

14. The system of claim 12, wherein the amplitude error distribution has a positive tail and a negative tail, wherein the the upper error threshold is within the negative tail, and wherein the lower error threshold is within the positive tail.

15. The system of claim 12, wherein each of the signal amplitude errors represents a difference between a signal value for one of the signals as transmitted from a transmitter and signal value for the one signal as received by a receiver, the transmitter and receiver remotely located from each other.

16. A system for detecting non-linear amplitude distortion, comprising:
an error detector configured to estimate signal amplitude errors associated with signals communicated across a telecommunication line, each of the signal amplitude errors representing a difference in amplitude between a respective one of the signals as transmitted from a transmitter and the one signal as received by a receiver, wherein the transmitter and receiver are remotely located from each other; and
logic configured to track the signal amplitude errors and to determine a first value indicative of a number of the signal amplitude errors below an upper error threshold, the logic configured to determine a second value indicative of a number of the signal amplitude errors above a lower error threshold and to perform a comparison of the first and second values, wherein the comparison indicates whether an amplitude error distribution of the signal amplitude errors is symmetrical, wherein the logic is configured to detect whether the signals are subject to non-linear amplitude distortion based on the comparison, and wherein the logic is configured to indicate that the signals are subject to non-linear amplitude distortion if the comparison indicates that the amplitude error distribution is asymmetrical.

17. system of claim 16, wherein the error detector is implemented within a decoder, the decoder configured to map the signals into digital data.

18. The system of claim 16, wherein the logic is configured to determine a third value indicative of an average magnitude for a plurality of the signal amplitude errors, and wherein the logic is configured to calculate the upper error threshold based on the third value.

19. system of claim 16, wherein the logic is configured to determine the upper error threshold and the lower error threshold based on the signal amplitude errors.

20. A method for detecting non-linear amplitude distortion, comprising the steps of:
receiving signals from a telecommunication line;
detecting signal amplitude errors associated with the received signals;
determining a first value indicative of a number of the detected signal amplitude errors that are within a first specified range, wherein the first specified range is within a first tail of an amplitude error distribution of the signal amplitude errors;
determining a second value indicative of a number of the detected signal amplitude errors that are within a second specified range, wherein the second specified range is within a second tail of the amplitude error distribution;
comparing the first and second values, wherein the comparing step is indicative of whether the signal amplitude error distribution is asymmetrical;
detecting whether the signals are subject to non-linear amplitude distortion based on the comparing step; and
indicating that the signals are subject to the non-linear amplitude distortion if the comparing step indicates that the signal amplitude error distribution is asymmetrical.

21. The method of claim 20, wherein the first specified range is above a threshold, and wherein the determining step comprises the step of comparing each of the detected signal amplitude errors to the threshold.

22. The method of clam 20, wherein the first specified range is below a threshold, and wherein the determining step comprises the step of comparing each of the detected signal amplitude errors to the threshold.

23. The method of claim 20, further comprising the step of determining whether the first and second values are substantially different, wherein the detecting whether the signals are subject to non-linear amplitude distortion step is based on the determining whether the first and second values are substantially different step.

24. The method of claim 20, wherein an absolute value of the upper error threshold is substantially equal to an absolute value of the lower error threshold.

25. The method of claim 20, wherein the determining step comprises the step of counting the number of the signal amplitude errors that are within the first specified range.

26. The method of claim 20, wherein the comparing step comprises the steps of:
determining a first difference between the first value and a first threshold;
determining a second difference between the second value and a second threshold; and
comparing the first and second differences.

27. The method of claim 20, wherein a plurality of the signal amplitude errors are within the first specified range, wherein the method further comprises the steps of counting the plurality of signal amplitude errors, and wherein the first value is based on the counting step.

28. A method for detecting non-linear amplitude distortion, comprising the steps of:
receiving signals communicated across a telecommunication line;
selecting an upper error threshold for a first tail of an amplitude error distribution for the signals;
selecting a lower error threshold for a second tail of the amplitude error distribution;
determining a first value indicative of a number of the signal amplitude errors below the upper error threshold;
determining a second value indicative of a number of the signal amplitude errors above the lower error threshold;
comparing the first and second values, wherein the thresholds are selected such that the comparing step indicates whether the amplitude error distribution is asymmetrical;
detecting whether the signals are subject to non-linear amplitude distortion based on the comparing step; and indicating that the signals are subject to the non-linear amplitude distortion if the comparing step indicates that the amplitude error distribution is asymmetrical.

29. The method of claim 28, further comprising the steps of:

generating error signals indicative of an amount of amplitude error detected for the received signals; and determining a third value indicative of an average magnitude for a plurality of the error signals wherein the selecting the upper threshold step is based on the third value.

30. The method of claim 28, wherein the amplitude error distribution has a positive tail and a negative tail, wherein the upper error threshold is within the negative tail and wherein the lower error threshold is within the positive tail.

* * * * *